(12) United States Patent
Parke et al.

(10) Patent No.: US 11,055,807 B2
(45) Date of Patent: Jul. 6, 2021

(54) METHOD AND SYSTEM FOR A TRANSACTIONAL BASED DISPLAY PIPELINE TO INTERFACE WITH GRAPHICS PROCESSING UNITS

(71) Applicant: Apple Inc., Cupertino, CA (US)

(72) Inventors: Bruce A. Parke, Tracy, CA (US); Maria A. Tovar, Atherton, CA (US)

(73) Assignee: Apple Inc., Cupertino, CA (US)

( * ) Notice: Subject to any disclaimer, the term of this patent is extended or adjusted under 35 U.S.C. 154(b) by 22 days.

(21) Appl. No.: 15/979,139

(22) Filed: May 14, 2018

(65) Prior Publication Data
US 2018/0357746 A1  Dec. 13, 2018

Related U.S. Application Data

(60) Provisional application No. 62/518,401, filed on Jun. 12, 2017.

(51) Int. Cl.
| | |
|---|---|
| *G06T 1/20* | (2006.01) |
| *G06F 9/46* | (2006.01) |
| *G06F 9/54* | (2006.01) |
| *G06F 9/448* | (2018.01) |
| *G06F 16/901* | (2019.01) |

(52) U.S. Cl.
CPC ............... *G06T 1/20* (2013.01); *G06F 9/448* (2018.02); *G06F 9/466* (2013.01); *G06F 9/546* (2013.01); *G06F 16/9017* (2019.01)

(58) Field of Classification Search
None
See application file for complete search history.

(56) References Cited

U.S. PATENT DOCUMENTS

| | | | |
|---|---|---|---|
| 7,839,410 B1* | 11/2010 | Brown | G06T 15/04 345/541 |
| 8,001,531 B1* | 8/2011 | Rideout | G06F 11/3664 709/217 |

(Continued)

OTHER PUBLICATIONS

Foley, T., Hanrahan, P. 2011, "Spark: Modular, Composable Shaders for Graphics Hardware," ACM Trans. Graph. 30, 4, Article 107 (Jul. 2011), 12 pages, DOI=10.1145/1964921.1965002 http://doi.acm.org/10.1145/1964921.1965002.

(Continued)

*Primary Examiner* — Sarah Le
(74) *Attorney, Agent, or Firm* — Blank Rome LLP

(57) ABSTRACT

Interfacing with a graphics processing unit (GPU) in a computer system in a transactional manner is disclosed. Discovering feature data regarding the GPU includes determining if the GPU understands transactional-based communication and may be determined by query or by using a look up table (LUT) containing one or more configuration identifiers. Transactions include information including directives to be performed by the GPU and data on which to perform the directives. Transactions may be provided through an application program interface from a user level software module or possibly at the kernel level of an operating system. Transactions may be applied as atomic operations at a discrete point in time to prevent visible glitching or other undesirable display artifacts from being discernable on a display device (e.g., directly connected monitor or remote display device).

28 Claims, 7 Drawing Sheets

(56) References Cited

U.S. PATENT DOCUMENTS

| | | | |
|---|---|---|---|
| 8,854,383 B2 | 10/2014 | Tsai | |
| 9,064,322 B1* | 6/2015 | Wyatt | G06F 3/1438 |
| 2008/0001960 A1* | 1/2008 | Chen | G06T 15/04 |
| | | | 345/582 |
| 2010/0110089 A1* | 5/2010 | Paltashev | G06T 1/20 |
| | | | 345/522 |
| 2011/0242118 A1 | 10/2011 | Bolz | |
| 2012/0162234 A1 | 6/2012 | Blinzer | |
| 2015/0348224 A1 | 12/2015 | Avkarogullari | |
| 2016/0259757 A1* | 9/2016 | Metzgen | G06F 9/3851 |
| 2017/0004647 A1* | 1/2017 | Grossman | G06T 1/60 |
| 2017/0140572 A1 | 5/2017 | Apodaca | |

OTHER PUBLICATIONS

Fung, et al., "Hardware Transactional Memory for GPU Architectures," MICRO '11, Dec. 3-7, 2011, Porto Alegre, Brazil.

International Search Report and Written Opinion received in PCT Application No. PCT/US2018/035115 dated Aug. 3, 2018.

Sandy, Matt "DirectX 12", Mar. 20, 2014 (Mar. 20, 2014), pp. 1-19, XP002742458, URL:http://blogs.msdn.com/b/directx/archive/2014/03/20/directx-i2.aspx.

Widawsky, Ben "i915 Hardware Contexts (and some bits about batchbuffers)", Jan. 1, 2013 (Jan. 1, 2013), XP055495361, URL:https://bwidawsk.net/blog/index.php/2013/0I/i915-hardware-contexts-and-some-bits-about-batchbuffers.

* cited by examiner

METHOD AND SYSTEM FOR A TRANSACTIONAL BASED DISPLAY PIPELINE TO INTERFACE WITH GRAPHICS PROCESSING UNITS

BACKGROUND

The present application generally relates to a transactional display pipeline to interface with one or more graphics processing units (GPUs).

Conventional display pipelines are not based on a transactional interface to a GPU and do not utilize atomic display feature processing. In a conventional display pipeline, the feature request of the GPU and the data to be acted upon by the GPU with that feature are provided independently. In other words, the GPU is given a set of data and separately given a command to apply to that data.

Further, historically displays have included one or more blanking intervals such as a horizontal blanking interval and a vertical blanking interval. In a raster graphics display, the vertical blanking interval (VBI), also known as the vertical interval or VBLANK, is the time between the end of the final line of a frame or field and the beginning of the first line of the next frame. During the VBI, the incoming data stream is not displayed on the screen. In current displays there may not be a required blanking interval because they are not based on raster scanning. However, there may be a defined dead period during which display memory may be updated without updating the display so that a user is not presented with undesirable artifacts of the update process.

SUMMARY

Various embodiments disclosed herein are generally directed to methods and systems for a transactional interface (e.g., display pipeline) to a graphics processing unit (GPU). Transactions include a combination of feature and data representing a unit of work for the GPU. Transactions may be presented via a queue mechanism and processed in an atomic fashion at a discrete point in time to avoid visible artifacts on a display device. Transactions may be provided from a user level program interface or may be created within a kernel function of an operating system. GPU features and capabilities may be determined via one or more query functions to determine capabilities iteratively or by using a look up table containing configuration identifiers tied to specific capabilities of a GPU.

In one embodiment, a method for transactional interaction with a GPU is described. The method may be implemented in a system comprising a GPU and may include discovering feature data regarding the GPU, binding the feature data with transaction data according to directives received through an application program interface (API) from a user level software module, wherein the transaction data comprises information that influences the transformation of pixels prior to presentation on a display device, and wherein the feature data comprises information regarding the use of features of the GPU; submitting the transaction to a graphics pipeline, the transaction including the transaction data bound to the feature data; and processing the transaction by using GPU features according to the feature data to process the transaction data according to the transaction.

In another embodiment, the method may be embodied in computer executable program code and stored in a non-transitory storage device. In yet another embodiment, the method may be implemented in a processing device having a directly connected display (e.g., via cable) or a remotely connected display (e.g., via network or wireless communication technology).

DETAILED DESCRIPTION

Figure 1:
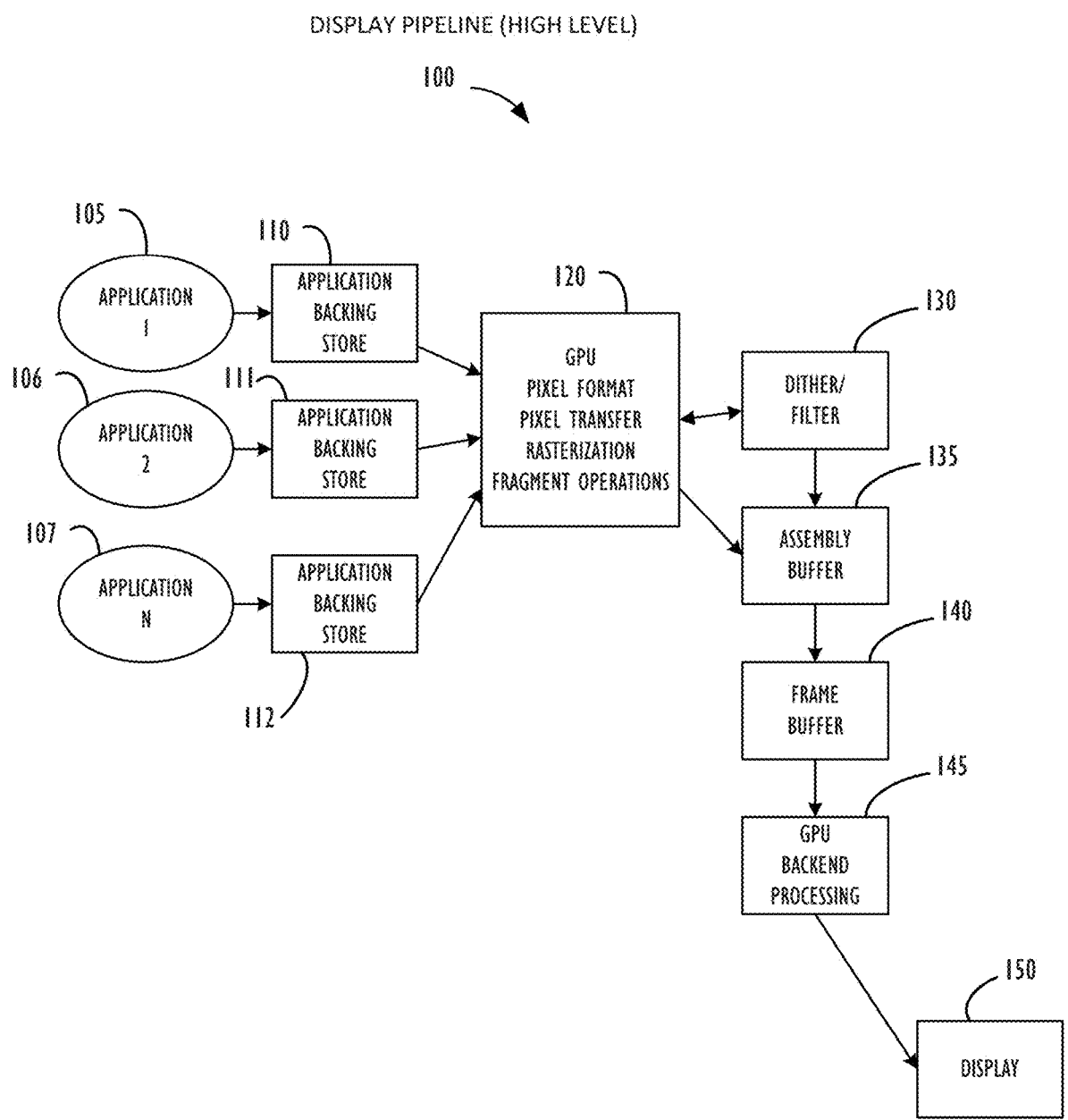
FIG. 1 shows, in block diagram form, a high level interaction of user level applications and their interaction with a display pipeline to present data on a display device according to one or more embodiments.

Disclosed are a system, computer readable media, and method for providing a framework, generally referred to as IOPresentment, and a set of APIs to interact with a GPU for graphical processing using a transactional model. According to one or more embodiments, the techniques include a description of how graphics drivers support the display pipeline to determine what colors are viewed on displays and on printed materials. Features that may be supported by the vendor's (e.g., the GPU vendor's) hardware include but are not limited to: pixel format of the application data and assembly buffer; scanout buffer characteristics (pixel format, type, and depth); gamma correction tables; precision of what is sent over the cable from the system to the display; and display characteristics (dithering, depth, and color gamut). In different embodiments it may be desirable that the graphics driver should support several pixel formats, scanout buffer configurations, gamma correction tables, and display color modes and depths. Format conversions between buffers and dithering between buffers should be supported. If necessary, output from the scanout buffer may be converted to a format supported by the display itself.

The following paragraphs address how to specify the transition to a new display pipeline state as a transaction (e.g., a transactional interface to a GPU). In this discussion, references will be made to APIs designed to perform certain functions. Examples of these APIs are provided throughout this disclosure as appropriate to facilitate with explanation of details for example embodiments.

The above-mentioned transaction contains a combination of display pipeline data (e.g., pixels, gamma, or color matrices) to be applied at a single point in time without visible glitching on the display device. First the IOPresentment framework will be introduced. Next will be a discussion on the display pipeline transaction model and its API. Finally, a description of the ConfigurationID will be presented. The ConfigurationID contains display pipeline inputs, outputs, and behavior, so vendor drivers can express specific features of their hardware and implementation that do not fit within the descriptors of the hardware API query command key as explained herein.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time consuming, but would nonetheless be a routine undertaking for those of ordinary skill in the art of image capture having the benefit of this disclosure.

Referring now to FIG. 1, block diagram 100 illustrates a high level display pipeline and its associated components according to one or more disclosed embodiment. Applications 105, 106, and 107 represent distinct user applications executing at a user level of a computer system hierarchy. Each of applications 105, 106, and 107 has an associated application backing store 110, 111, and 112 respectively. Each application backing store contains information pertaining to graphical information that may be presented as appropriate on display 150. Each of the application backing stores 110, 111, and 112 are communicatively coupled to GPU 120, which includes functions for pixel format, pixel transfer, rasterization, and fragment operations. These functions are examples only and GPU 120 is not limited to these functions. A dither/filter function is illustrated at block 130 with a bi-directional communication channel to GPU 120. Assembly buffer 135 is shown, in this embodiment, with communication channels to the dither/filter function 130 and GPU 120. Assembly buffer 135 may contain data in a float pixel format. Frame buffer 140 receives data from assembly buffer 135 in a frame buffer format after it has been processed by the GPU. Block 145 illustrates GPU backend processing, which may include dithering or gamma correction functions applied prior to ultimate display in display format on display 150.

IOPresentmentFramework

Figure 2:
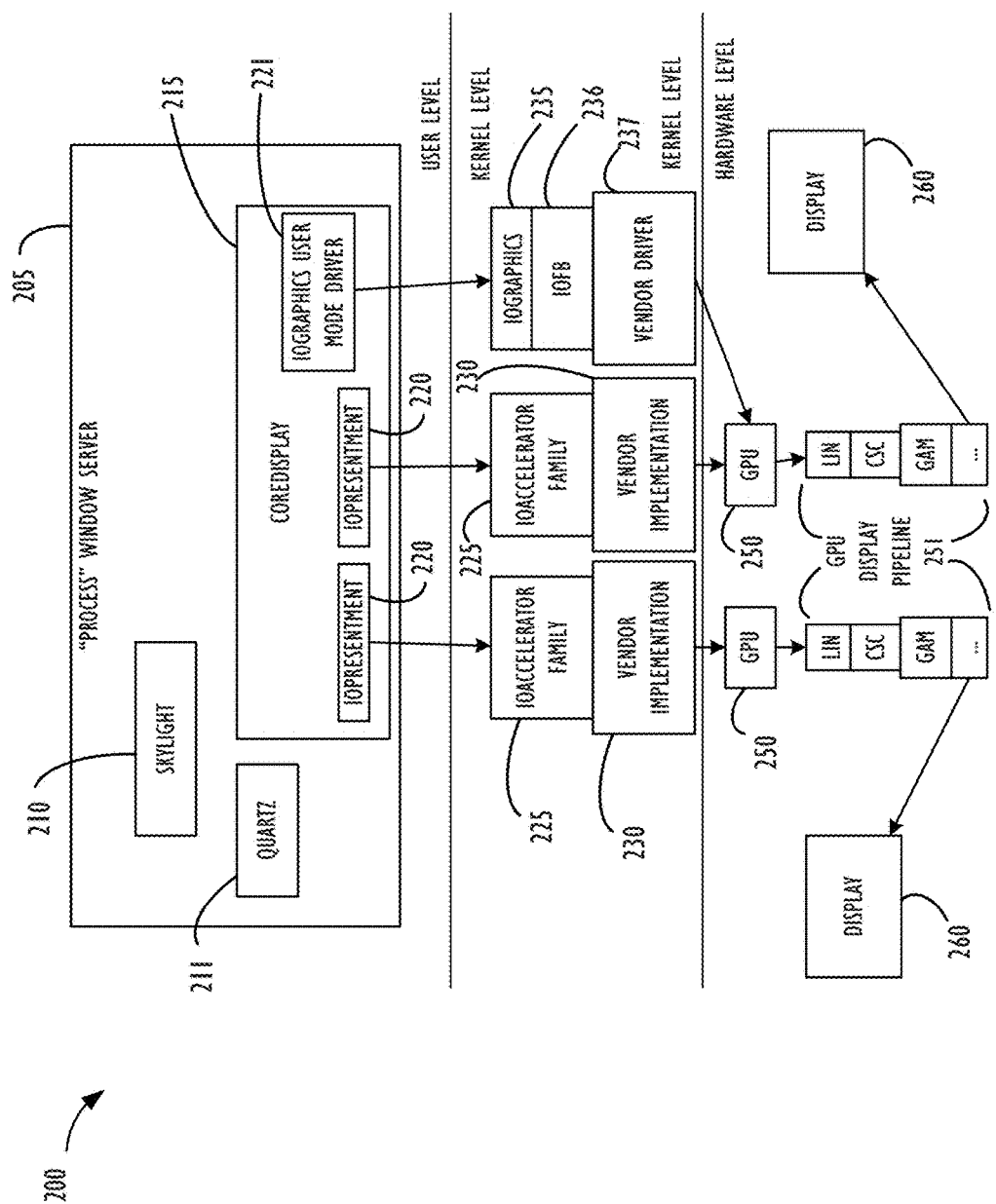
FIG. 2 shows, in block diagram form, an illustrative software, kernel, and hardware level architecture diagram according to one or more embodiments.

As disclosed herein, a "display pipeline transaction" represents encapsulation of a feature and the data required to perform a specific transition from the current display pipeline related state to a new display pipeline related state for an associated IOAcclerator Family (See 225 of FIG. 2). One significant benefit of a transaction is to be able to flip from one scanout surface to another scanout surface in an atomic fashion, with display pipeline transaction data that can describe transformations, pixel processing, and other features supported by the vendor's hardware. Atomicity delineates the latching of the transaction data so the transition is done at a single point in time without any user-visible artifacts (i.e., glitching). Application or hardware setup for the transaction may take several frames to occur.

Clients of a display pipeline transaction (e.g., user applications and processes) use the IOPresentment framework to communicate with vendor driver implementations. In one embodiment, IOPresentment is a user-mode driver (UMD) that provides a hardware-agnostic representation of the underlying display pipeline hardware and the physical transport, topology, and endpoint timings. In a second embodiment, IOPresentment is implemented as a kernel level interface providing similar capabilities. The level of implementation of IOPresentment within a software hierarchy is a design choice.

With that background, we turn to FIG. 2, which illustrates, in block diagram 200, an illustrative software, kernel, and hardware level architecture diagram according to one or more embodiments. There are three levels depicted in block diagram 200. The highest level is the user level (sometimes referred to as the application layer) and the lowest level is the hardware level with a kernel level as an interface between the two. This is a common logical hierarchy used to describe computer systems but strict delineation of the levels is not always fixed. In general, an operating system includes portions that execute and interface between both the user level and the kernel level. Vendor drivers (e.g., vendor implementation 230 and vendor driver 237) interface between kernel level portions (e.g., IOaccelerator Family 225 and IOGraphics 235 that may be considered part of the operating system) and actual hardware (e.g., GPU 250). Hardware devices (e.g., GPU 250) may also have imbedded software as an additional interface point prior to implementing an actual hardware function. Note that IOFB 236 represents an Input Output Frame Buffer used to pass data between IOGraphics 235 and vendor driver 237. IOFB 236 may also be directly accessible by hardware such as GPU 250.

As illustrated in block diagram 200, this example has a window server process 205 configured to control output to display devices from one or more user level applications (not shown). Window server process 205 has multiple components to perform different types of functions for these applications (e.g., Skylight 210, Quartz 211, and CoreDisplay 215). CoreDisplay 215 is pertinent for this example and provides interface functions for applications to actual display devices 260. Note that display devices 260 may be physical, virtual, directly connected, or remotely connected, for the purposes of this discussion. Different disclosed embodiments may be configured to talk to any manner of display device. CoreDisplay 215 includes IOPresentment 220 configured as disclosed herein, and IOGraphics User Mode Driver 221 which, for this example, is considered not to be transactionally based. As shown, each of IOPresentment 220 and IOGraphics User Mode Driver 221 provides the interface between the user level and the kernel level and is configured to talk to either IOAccelerator Family 225 or IOGraphics 235 as appropriate. Note that any number of IOPresentment 220 instances may exist within window server 205, for example an instance per GPU 250 detected for the system or an instance for each display (either real, virtual, remote, etc.) detected by the operating system. Also note that GPU 250 may be configured to talk to both vendor driver 237 and vendor implementation 230 within the context of this disclosure. Also note, within GPU 250 there may be implemented a set of functions for linearization, color space correction, gamma correction, etc. as shown by GPU Display Pipeline 251. The output of GPU Display Pipeline 251, in this example, is responsible for what is ultimately provided to display 260.

Figure 3:
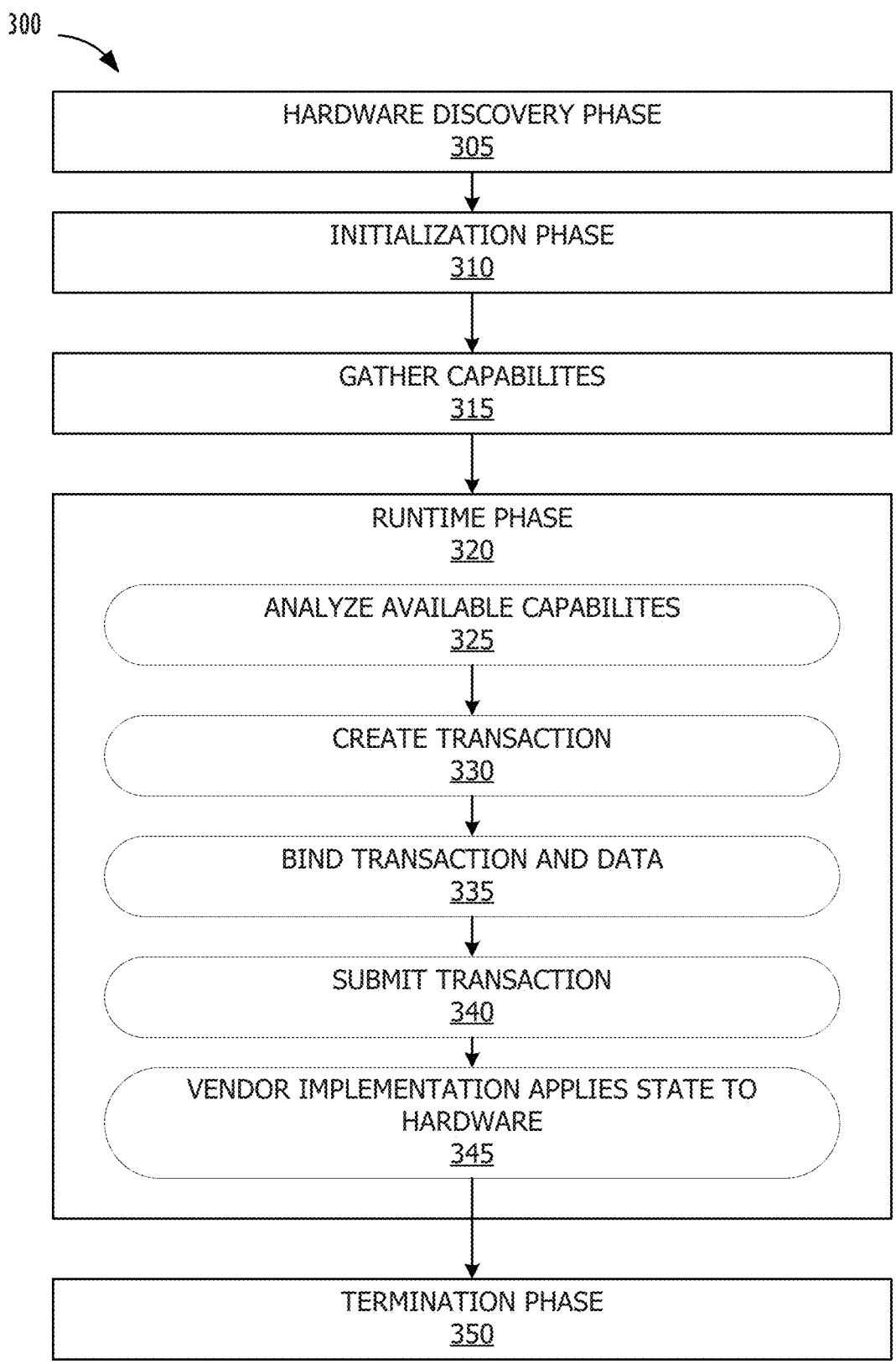
FIG. 3 shows, in flowchart form, a method for discovering capabilities of a GPU and performing graphics processing using encapsulated transactions submitted to the GPU according to one or more embodiments.

The polymorphic design and implementation of certain disclosed embodiments of IOPresentment encapsulate the discovery, communication, and management of transaction-related resources targeted for visual consumption through a display pipeline (See FIG. 3). IOPresentment is designed to interface with real, physical devices associated with a GPU and IOFrameBuffer and to enable and support non-IOFrameBuffer associations and/or non-physical devices (or non-local devices, like a device residing in a remote display).

Under one embodiment of IOPresentment, window server 205 owns the policy for content updates, except for self-refresh (when the same data is repeatedly re-consumed to prevent display decay). In this embodiment, IOPresentment controls enabling and disabling mirroring and rotation, but window server 205 owns the policy for when to perform these operations. For rotation, window server 205 may also specify the orientation. The underlying drivers, in this embodiment, may need to implement the functionality required to support mirroring and rotation in a transactional fashion.

With reference to FIG. 3 and flowchart 300, IOPresentment and its user clients pass through several phases that are described according to one disclosed embodiment. An IOPresentment Discovery Phase is shown at block 305. In one embodiment, IOPresentment provides a single interface for user clients to discover the number of logical displays that are transaction-capable within the system and the association of these logical displays to physical devices. According to this embodiment, to properly support discovery of GPU functions and transactional support, vendors are required to implement the following APIs: IOAccelDisplayPipe and an associated function and flag to indicate support for the transactional display pipeline capability, IOAccelDisplayPipeTransaction and an associated function and flag to indicate support for this API capability. Once support is determined, the vendor must also provide an API to obtain display pipeline data (e.g., IOAccellDisplayPipeData).

An IOPresentment Initialization Phase is shown at block 310. In some disclosed embodiments, IOPresentment goes through an initialization phase before it can be leveraged. During initialization, the user clients may choose the desired display target to apply transactions against. To enable IOPresentment to create IOAccelDisplayPipe objects and other required support structures for each desired display, the vendor interface for that display must indicate support for transactions and provide necessary interfaces to receive transactions.

Gathering IOPresentment Capabilities

In this embodiment, as shown at block 315, IOPresentment gathers the vendor and system capabilities via a variety of interfaces for each logical display target and presents these capabilities to the user client as a single dictionary that represents a logical display. Vendors can access the capabilities that are provided to IOPresentment via the appropriate API. These capabilities are valid for the associated logical display from the time at which they are queried until any subsequent reconfiguration event. Vendors are advised to only provide capabilities information for those features that are supported atomically, or where the associated feature can be applied to the hardware in a fashion that avoids visual corruption. The user client may be configured to provide a visual distraction when using features that are supported in a non-atomic fashion. User clients utilize these capabilities to determine what types of features and configurations of features can be leveraged for a transaction.

IOPresentment Runtime Phase (Block 320)

In one example embodiment, during runtime, user clients create a transaction, bind the transaction resource state to the transaction, and ultimately submit the transaction for consumption by the vendor implementation. A possible runtime event flow of a transaction from the user client to vendor driver implementation is illustrated in block 320. First, at block 325, user clients analyze the capabilities and determine what, if any, feature (or configuration) can be leveraged. Block 330 indicates that user clients create a transaction and then at block 335 bind surface(s) and/or transaction resource state(s) to a transaction. At block 340, user clients submit the transaction. At block 350, the vendor implementation of an API to submit or perform the transaction may be called to apply the state to the hardware. At this point the run time phase 320 is considered complete and flow continues to block 350.

IOPresentment Termination Phase (Block 350)

After use of IOPresentment has been completed, it may be desirable to provide a termination phase 350 and free resources back to the system. To support termination, vendor implementation changes may not be required.

Display Pipeline Transaction Model

Display Pipeline Transaction Model Terminology

The following terms are used to describe the transaction model implementation for display pipeline operations according to one embodiment.

Display Pipeline Transaction—The encapsulation of data required to perform a transition to a new display pipeline related state.

Display Pipeline Transaction Data—The data that is used during the performance of a transaction, such as pixel data, gamma tables, CSC matrices, pixel format, surface dimensions, and transformation information.

Display Pipeline Feature Blocks—Display pipeline feature blocks describe at a high level the features and functionality, such as gamma, CSC, linearization, etcetera, that are found within the display pipeline or display plane.

Display Pipeline—The representation of a single logical connection to an end-point (a.k.a. glass, simple display, or complex display). A display pipeline contains several feature blocks. A display pipeline has one or more display planes, and by extension, a display pipeline contains one or more feature blocks that describe high-level features and functionality.

Display Plane—A buffer associated with a display pipe that contains a representation of the Z-ordered pixels that are presented to the end-user after the pixels have passed through any of the display plane and pipeline features. A display plane contains one or more feature blocks.

Figure 4:
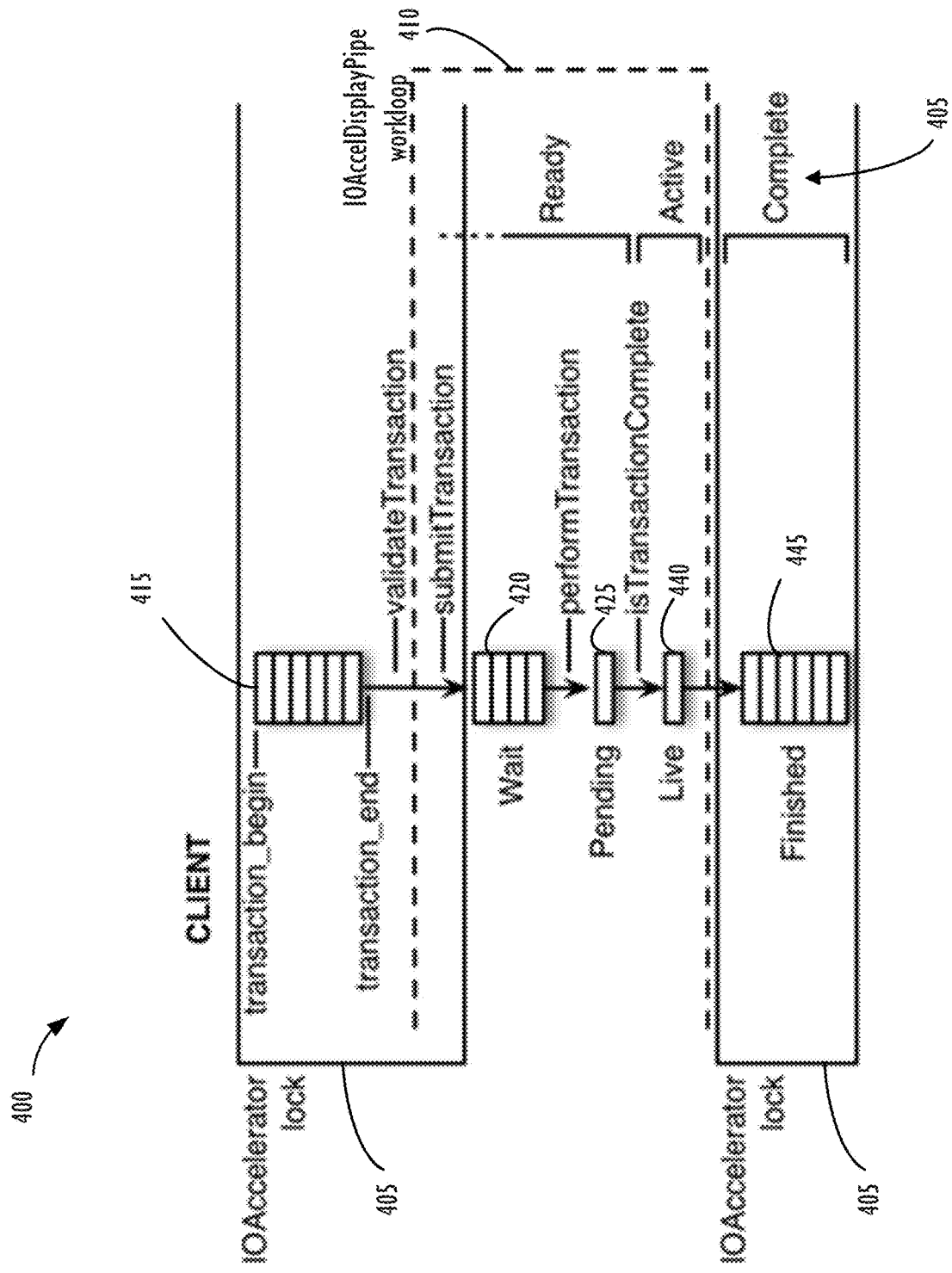
FIG. 4 shows one possible timeline and associated queuing implementation to process graphical transactions according to one or more embodiments.

Transaction Resource States (see FIG. 4)

In one example embodiment, there are three transaction resource states although any number of states may be defined as required. The three states of this example include:

Ready—a state that indicates the resources have had all dependencies resolved, and all GPU generation has completed; Active—a state that indicates the transaction resources are in use for active scanout; and Complete—a state that indicates the resources are no longer in use for active scanout.

Pipeline Flow Stages (see FIG. 4)

As illustrated in timeline 400 of FIG. 4, there are four pipeline flow stages defined for a submitted transaction according to one disclosed embodiment. Queue representations are shown as elements 415, 420, 425, 440, and 445 of FIG. 4. As illustrated by element 415, a plurality of transactions may be prepared at the client and validated for submission. Once submitted, the states of the queue entries progress through the four pipeline flow stages. Wait 420—the stage that indicates the transaction has been queued internally in IOAcceleratorFamily, which has successfully passed a call to validateTransaction( ), but has not yet been provided to the vendor driver via either submitTransaction( ) or performTransaction( ). Pending 425—The stage that indicates the transaction has been provided to the vendor driver via either submitTransaction( ) or performTransaction( ) but has not been processed to the point where the resources are actively being used for scanout, as determined by receiving false from isTransactionComplete( ). Live 440—The stage that indicates that the resources are now actively in use for scanout, as determined by receiving true from isTransactionComplete( ). Finished 445—The stage that indicates the resources are no longer actively in use for scanout, and that these resources can be freed.

Display Pipeline Transaction Objects

Transactions may be represented by IOAccelDisplayPipeTransaction objects that are created within IOAccelDisplayPipe::transaction_begin( ) while the accelerator lock 405 is held. The current user client and accelerator are associated with the transaction at creation. All data required by the transaction are contained within a single transaction object. Transaction objects, by design, are not dependent upon other transaction objects. Transaction objects contain all data (such as pixel data, gamma tables, CSC matrices, pixel format, and surface dimensions) that is required to perform a transition to a new display pipeline state. This example embodiment supports two display planes (indexed by 0 and 1) per display pipe.

Transaction Flow

FIG. 4 also shows how display pipeline transactions are created and processed. All transactions are encapsulated within a pair of user-client calls: transaction_begin and transaction_end (see queue element 415). Between the begin and end calls, the client can bind transaction data to a transaction as required or desired. The transaction_begin call creates an "under construction" transaction object and places this object in the initial queue 415. After the desired data has been bound, the user client calls transaction_end, which dequeues the transaction and dispatches it to the vendor implementation, where the transaction is processed by the underlying hardware and drivers. Clients are free to create a number of transactions, limited by the maximum size of the queue. The client provides a submission timestamp that determines when a given transaction is processed by the underlying implementation. This enables transactions to be processed in any order.

The vendor driver first receives a call to validateTransaction( ) to validate the transaction. In this embodiment, this is the only time during the transaction flow when the user client can receive an error from the vendor driver regarding the validity of the transaction and where the vendor driver can safely reject the transaction. If the validation fails, the user client can modify and resubmit the transaction. If the validation succeeds, the transaction resources are prepared. When all the dependencies are resolved for the transaction resources and all GPU generation has been completed, the transaction resource state is set to Ready (see element 405 indicating resource states in FIG. 4). At this time the vendor may be requested to page the resources onto the GPU, if not already present, via the standard IOAcceleratorFamily paging mechanism. An IOAccelEventMachine event is created for the transaction that merges all the resource write events. The transaction object is then provided to the vendor driver via submitTransaction( ) while under the IOAccelerator lock 405 and within the IOAccelDisplayPipe work loop 410. If the vendor implements submitTransaction( ), the vendor cannot fail to accept the transaction. The transaction object flows into the Wait queue 420 while under the IOAccelerator lock 405 and within the IOAccelDisplayPipe work loop 410. If the vendor does not implement submitTransaction( ), the transaction object flows into the Wait queue 420, where the vendor will be requested to perform the transaction via performTransaction( ). When the vendor driver is called via performTransaction( ), it is not under the IOAccelerator lock 405, but it is within the IOAccelDisplayPipe work loop 410.

The transaction object presented to the vendor driver via either submitTransaction( ) or performTransaction( ) is placed in the Pending queue 425. The transaction object remains in the Pending queue 425 until the vendor returns true from isTransactionComplete( ), which indicates that: The transaction in the Pending queue 425 has been moved from a Ready state to an Active state, which indicates the transaction resources are in use for scanout, The transaction in the Live queue 440 has been moved to the Finished queue 445, The transaction in the Pending queue 425 has been moved to the Live queue 440, and The Pending queue 425 is cleared.

The transaction in the Live queue 440 remains in that queue until the next transaction pushes it from the Live queue 440 to the Finished queue 445. Transactions in the Finished queue 445 are cleaned up under both the IOAccelerator lock 405 and IOAccelDisplayPipe work loop 410. Any transaction resources that are no longer in use for active scanout (i.e., in the Complete state) may be cleaned up. In some embodiments, CoreDisplay is required to use transactions exclusively, so the vendor driver does not receive swap requests between transactional and non-transactional implementations as a design choice.

Vendor Transaction Application

When submitTransaction( ) or performTransaction( ) is called, the transaction object may be provided to the vendor implementation. The vendor implementation can query the object for the required resource state and act accordingly to apply the transaction. In one example embodiment, when the vendor implementation receives a request to process the transaction, there are three courses of action:

1. After successfully processing the transaction, the vendor implementation returns a success status.

2. performTransaction( ) only: If the vendor implementation cannot process the transaction at the current point in time, it may return the error code ReturnNotReady. Returning ReturnNotReady does not remove the transaction from the Pending queue 425.

3. If the event test fails to report that the GPU is done processing the resources, the timestamp interrupts may be enabled. After enabling the stamp interrupts to catch any race condition between stamp interrupt enable and the event test, the event may be immediately retested for completion.

After a second failed test that indicates the GPU is still not done with the resources, the pending transaction may be left in the Pending queue until the vendor's implementation signals that the GPU work associated with the transaction resources has completed. In this embodiment, it is essential that the vendor understands that, according to this embodiment, no further transactions are processed until the vendor driver signals the IOAccelDisplayPipe.

If an invalid state or other limitation prevents the vendor implementation from processing the transaction, the vendor may reject the transaction with an appropriate error code. The transaction is removed from the Pending queue 425, and no further processing is attempted. Returning an error code from submitTransaction( ) or performTransaction( ) results in dropping the transaction, which may cause a poor user experience. Before submitTransaction( ) or performTransaction( ) are called, the vendor may wish to call the validateTransaction( ) API to prevent encountering error conditions. After the vendor implementation returns a success or an error code, the transaction is removed from the Pending queue 425.

Figure 5:
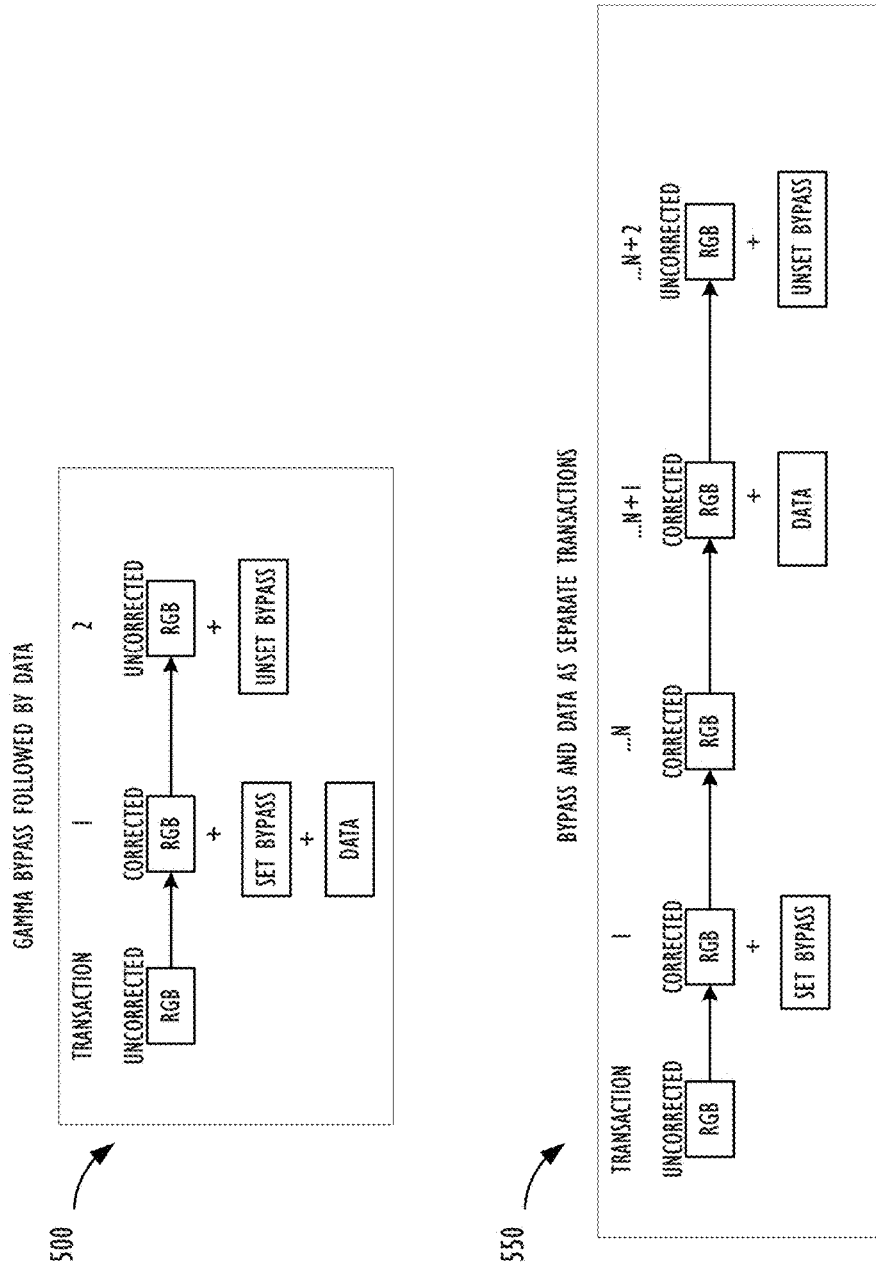
FIG. 5 shows two example diagrams, the first showing a gamma bypass followed by data and the second showing bypass and data as separate transactions according to one or more embodiments.

Display Pipeline Feature Block Operation (See FIG. 5)

In some cases, a display pipe may be able to support L/CSC/G (linearization, color space correction, gamma), but may not be able to provide atomic control of some blocks (e.g., gamma). A driver may support a transaction that ensures an atomic implementation to set (or unset) bypass for one or more L/CSC/G display pipeline feature blocks, and the driver must indicate that support in a capability flag.

The BypassInlineData capability indicates that the data associated with the bypassed feature must be sent in the same transaction that enables the bypass, as shown in example 500 of FIG. 5. The BypassInlineData transaction includes: The bypass enable, Corrected frame, and Pipeline feature block data (such as Gamma LUT or CSC coefficients). For many implementations, a transaction is latched to a blanking period. The BypassInlineData transaction is preferred to be atomic where an implementation supports double buffering of the feature data (either in software or hardware), or the implementation can program the hardware with the feature data after the feature block has been placed into a bypass mode.

If the BypassInlineData capability is not available for the vendor driver, then CoreDisplay generates these transactions, as seen in example 550 of FIG. 5. In example 550, a first transaction with L/CSC/G flags sets bypass atomic control of selected function block(s) with a corrected frame. This may be followed by any number of subsequent transactions, each with a corrected frame. The number of these frames can be zero. Next is a transaction with pipeline feature block data (such as Gamma LUT or CSC coefficients) and a corrected frame. Followed by a final transaction with an uncorrected frame and flags to unset bypass. These transactions may be latched to the blanking periods.

According to one example embodiment, the following steps describe transaction support for pixel flow from apps to the Window Server (205 of FIG. 2) to CoreDisplay (215 of FIG. 2) to the vendor implementation (230 of FIG. 2):

1. IOPresentment obtains the vendor driver capability flags, including bypass and transaction capabilities.

2. If the vendor driver has the capability to perform all pipeline feature block processing in a single atomic transaction, then CoreDisplay can generate a transaction that sends an uncorrected frame of pixel data to the vendor driver and lets it perform feature block processing and generate a frame ready for display. (Feature block changes can also be sent without frame data.)

3. If the vendor driver does not have the transaction capability described in step 2 but does have the BypassInlineData capability, then CoreDisplay should generate these transactions:
  a) A first transaction with corrected pixel data and L/CSC/G flags to set bypass atomic control of selected function block(s).
  b) A second transaction with uncorrected pixel data (resulting from the first transaction) and flags to unset bypass.

4. If the vendor driver does not have the BypassInlineData transaction capability described but does support the bypass capability without data, then CoreDisplay should generate these transactions:
  a) A first transaction with L/CSC/G flags to set bypass atomic control of selected function block(s).
  b) A second transaction with corrected pixel data.
  c) A third transaction with uncorrected pixel data (resulting from the first two transactions) and flags to unset bypass.

If the vendor driver does not have the transaction capability described in step 4, then the vendor driver is not used, and a software solution processes the frame data. Drivers ensure the transaction succeeds and is applied, or the validation fails. In case of failure, CoreDisplay applies equivalent operations and submits a new transaction, which may bypass the IOPresentment blocks. In those cases, CoreDisplay may use IOPresentment to pre-apply the Night Shift white point adjustment before sending those frames to IOPresentment. For such frames, CoreDisplay is likely to submit transactions to configure unused blocks, so that frames bypass them.

Display Pipeline Transaction API
IOAccelDisplayPipe Class API

To support certain disclosed embodiments, possible embodiments of APIs are discussed here as examples only. In one example, the vendor must implement the isTransactionComplete method and either the performTransaction or submitTransaction method. The vendor has the option to implement the validateTransaction method to conduct transaction validation prior to submission. The vendor can optionally extend the IOAccelDisplayPipeTransaction class to include vendor-specific methods and member variables, and implement corresponding changes to the newDisplayPipeTransaction method.

isTransactionComplete
Required implementation by vendor
Determines if a display pipeline transaction has completed.
(bool) isTransactionComplete (IOAccelDisplayPipeTransaction*transaction)
Return Value
Returns true if transaction is in the Active state. Returns false if transaction is not in the Active state. (For a description of Active state, see section 10.2.1.)
To support this functionality correctly, vendors may need to manage and track transaction data internally.
Parameters—transaction an object that encapsulates display pipeline operations.
newDisplayPipeTransaction
Optional implementation by vendor
Creates a new display pipeline transaction.
(IOAccelDisplayPipeTransaction*) newDisplayPipeTransaction (void)
Return Value
Returns an object that encapsulates a set of display pipeline operations.

Parameters—none
submitTransaction
Required implementation by vendor, if performTransaction is not implemented Enqueue a transaction for processing by the hardware under the IOAccelerator lock and the IOAccelDisplayPipe workloop. Vendors have to manage the fencing of the resources to the display flip and have access to the transaction's fEvent, which is a merge of all the resource write events associated with the transaction.
(IOReturn) submitTransaction (IOAccelDisplayPipeTransaction*transaction)
Return Value
Return kIOReturnUnsupported if the transaction is to be processed via performTransaction.
Return kIOReturnSuccess if the transaction is processed successfully.
Returning any other error defined in IOKit/IOReturn.h results in dropping the transaction.
The vendor must not fail this call. Depending on the vendor architecture, the vendor may need to manage the enqueue/dequeue of the transition internally to their driver.
Parameters—transaction an object that encapsulates display pipeline operations.
performTransaction
Required implementation by vendor, if submitTransaction is not implemented Enqueue a transaction for processing by the hardware under the IOAccelDisplayPipe workloop. The IOAccelerator lock is not taken when this method is called.
(IOReturn) performTransaction (IOAccelDisplayPipeTransaction*transaction)
Return Value
Returns kIOReturnSuccess if the transaction is processed successfully.
Returns kIOReturnNotReady if the transaction cannot be processed at the current point in time.
Returns some other error defined in IOKit/IOReturn.h if the transaction cannot be processed at all. The transaction is removed from the queue, and the vendor has no further opportunity to process the transaction. Effectively, the transaction is dropped.
Parameters—transaction an object that encapsulates display pipeline operations.
validateTransaction
Optional implementation by vendor, but strongly recommended
Validate a transaction before it has its resources prepared, event created, and is enqueued. This is the only chance for the vendor to intercept and validate vendor-specific requirements. After validation, the transaction must be processed without error.
If validateTransaction( ) is not implemented or if it is implemented without sync validation, the implementation must support the fallback behavior described in section 5.3.6.2 (Table 20). If transaction contains an invalid sync type, validateTransaction( ) fails.
(IOReturn) validateTransaction (IOAccelDisplayPipeTransaction*transaction)
Return Value
Returns kIOReturnSuccess if the transaction is validated.
Parameters—transaction an object that encapsulates display pipeline operations.
submitFlipBufferTransaction
The vendor does not implement this method
This submits a fixed-function transaction that results in an allocation of a transaction object, the application of fixed state (CSC identity matrix), transaction object onto the tail of the transaction queue.
Return Value
none
Parameters—none
IOAccelEventMachine Class API
enableStampInterrupt
disableStampInterrupt
Required implementation by vendor
Enable or disable delivery of GPU interrupts for timestamp updates to the IOAccelDisplayPipeTransaction work loop.
(void) enableStampInterrupt (int32_t stamp_idx) (void) disableStampInterrupt (int32_t stamp_idx)
Return Value
None
Parameters—stamp_idx The stamp index to enable/disable
In certain embodiments, the vendor must implement timestamp interrupts for use by the IOAccelDisplayPipeTransaction workloop. The transaction event is a merge of the resource write events contained within the transaction, and this transaction event is used to fence the GPU utilization of the resources to the display flip. If the event test fails to report that the GPU is done processing the resources, the timestamp interrupts are enabled. After enabling the timestamp interrupts to catch any race condition between timestamp interrupt enable and the event test, the event is immediately retested for completion. After a second failed test that indicates the GPU is still not done with the resources, the pending transaction is left in the Pending queue until the vendor's implementation signals the GPU work associated with the transaction resources has completed. It is essential that the vendor understands that no further transactions are processed until the vendor driver calls IOAccelEventMachine::signalStamp( ) to signal the IOAccelDisplayPipe.

Vendors that implement submitTransaction( ) have to manage the fencing of the GPU resources to their display engine updates. The fEvent is a protected member of the IOAccelDisplayPipeTransaction class that allows vendor drivers to access it.
IOAccelDisplayPipeTransaction Class API
The following methods are provided as a reference and should not be considered limiting in any manner.
getPipeColorMatrix
Returns the associated color matrix, if bound.
(sIOAccelDisplayPipeColorMatrix) getPipeColorMatrix (void) const
Return Value
A 3×4 matrix of floats.
Parameters
None
Related Definitions
This returns color values in a sIOAccelDisplayPipeColorMatrix structure.

```
typedef struct IOAccelDisplayPipeColorMatrix
{
    float red[4]; float
    green[4]; float blue[4];
} sIOAccelDisplayPipeColorMatrix;
``` getPipeColorMatrixArgs
Returns the extended arguments associated with the color matrix, if bound. (For details, see ConfigurationID in section 10.4.)
(sIOAccelDisplayPipeColorMatrixArgs) getPipeColorMatrixArgs (void) const
Return Value
An object that describes the color matrix.
Parameters
None
Related Definitions
This returns values in a sIOAccelDisplayPipeColorMatrixArgs structure.

```
typedef struct IOAccelDisplayPipeColorMatrixArgs
{
    uint64_t type; uint64_t
    format;
    uint64_t configurationID;
} sIOAccelDisplayPipeColorMatrixArgs;
``` getPipePostGammaTable
Returns the associated post-CSC gamma table object (similar to IOFBSetGamma), if bound. Vendor implementations may need to convert values to an appropriate hardware format.
(IOAccelDisplayPipeGammaTable*) getPipePostGammaTable (void) const
Return Value
A wrapper object contains post-CSC gamma entries in a sIOAccelDisplayPipeGammaTableData structure.
Parameters—None
Related Definitions
The returned IOAccelDisplayPipeGammaTable object contains a sIOAccelDisplayPipeGammaTableData structure that describes the gamma table.

```
typedef struct IOAccelDisplayPipeGammaTableData
{
    uint32_t count; uint32_t
    pad0; uint64_t type;
    uint64_t format;
    uint64_t configurationID; float
    entriesMin;
    float entriesMax;
    sIOAccelDisplayPipeGammaTableEntry entries[0];
} sIOAccelDisplayPipeGammaTableData;
```

The sIOAccelDisplayPipeGammaTableData structure has a pointer to a table that consists of sIOAccelDisplayPipeGammaTableEntry entries.

```
typedef struct IOAccelDisplayPipeGammaTableEntry
    float red; float green;
    float blue; float
    reserved;
} sIOAccelDisplayPipeGammaTableEntry;
``` getPipePreGammaTable
Returns the associated pre-CSC linearization gamma table object, if bound. Vendor implementations may need to convert values to an appropriate hardware format.
(IOAccelDisplayPipeGammaTable*) getPipePreGammaTable (void) const
Return Value
A table of floats that contains pre-CSC gamma entries.
Parameters—None
Related Definitions
See getPipePostGammaTable.

getPlaneIOSurface
Returns the IOSurface object associated with the plane and stereo index. If bound, an IOSurface and/or IOAccelResource may represent the pixel data associated with a transaction. For example, if the vendor implements submitFlipBufferTransaction, then no IOSurface object exists for the associated transaction.
(IOSurface*) getPlaneIOSurface (uint32_t planeIndex, uint32_t stereoIndex) const
Return Value
The IOSurface associated with the plane and stereo index.
Parameters—planeIndex the plane for this transaction; stereoIndex—the stereo index for this transaction getPlaneResource
Returns the IOAccelResource object associated with the plane and stereo index. If bound, an IOAccelResource and/or IOSurface may represent the pixel data associated with a transaction.
(IOAccelResource*) getPlaneResource (uint32_t planeIndex, uint32_t stereoIndex) const
Return Value
The IOAccelResource associated with the plane and stereo index.
Parameters—planeIndex the plane for this transaction; stereoIndex—the stereo index for this transaction getPlaneSrcRect
Returns the source rectangle for the resource associated with the plane.
(sIOAccelDisplayRect) getPlaneSrcRect (uint32_t planeIndex) const
Return Value
The source rectangle for the resource associated with the plane.
Parameters—planeIndex The plane for this transaction
Related Definitions
The returned sIOAccelDisplayRect structure specifies the source rectangle.

```
typedef struct IOAccelDisplayRect
{
    float x; float
    y; float w;
    float h;
} sIOAccelDisplayRect;
``` getTransactionDirtyBits
Returns the dirty bits that define what state has been bound to the transaction. Vendor drivers can use these to determine what information needs to be pulled from the transaction object.
(uint64_t) getTransactionDirtyBits (void) const
Return Value
The dirty bits associated with the transaction.
Parameters—None getTransactionID
Returns the ID associated with this transaction.
(uint32_t) getTransactionID (void) const
Return Value
The transaction ID.
Parameters—None getTransactionOptions
Returns the options associated with the display pipe that have been set for the transaction.

(uint32_t) getTransactionOptions (void) const
Return Value
The transaction options.
Parameters—None
Related Definitions
getTransactionOptions returns eIOAccelDisplayPipeTransactionOption option values.

```
enum eIOAccelDisplayPipeTransactionOption
{
    kIOAccelDisplayPipeTransactionSyncToVBL = 0x01,
    kIOAccelDisplayPipeTransactionEnableDPB = 0x02,
    kIOAccelDisplayPipeTransactionGammaBypass = 0x04,
    kIOAccelDisplayPipeTransactionDPBWeak = 0x08,
    kIOAccelDisplayPipeTransactionDPBStrong = 0x10,
    kIOAccelDisplayPipeTransactionDPBModeMask =
        kIOAccelDisplayPipeTransactionDPBWeak |
        kIOAccelDisplayPipeTransactionDPBStrong,
    kIOAccelDisplayPipeTransactionSyncToHBL = 0x20,
    kIOAccelDisplayPipeTransactionColorMatrixBypass = 0x40,
    kIOAccelDisplayPipeTransactionLinearizationBypass = 0x80,
    kIOAccelDisplayPipeTransactionGammaBypassInlineData = 0x100,
    kIOAccelDisplayPipeTransactionColorMatrixBypassInlineData =
        0x200,
    kIOAccelDisplayPipeTransactionLinearizationBypassInlineData =
        0x400,
    kIOAccelDisplayPipeTransactionGammaBypassDisable = 0x800,
    kIOAccelDisplayPipeTransactionColorMatrixBypassDisable =
        0x1000,
    kIOAccelDisplayPipeTransactionLinearizationBypassDisable =
        0x2000,
};
```

Figure 6:
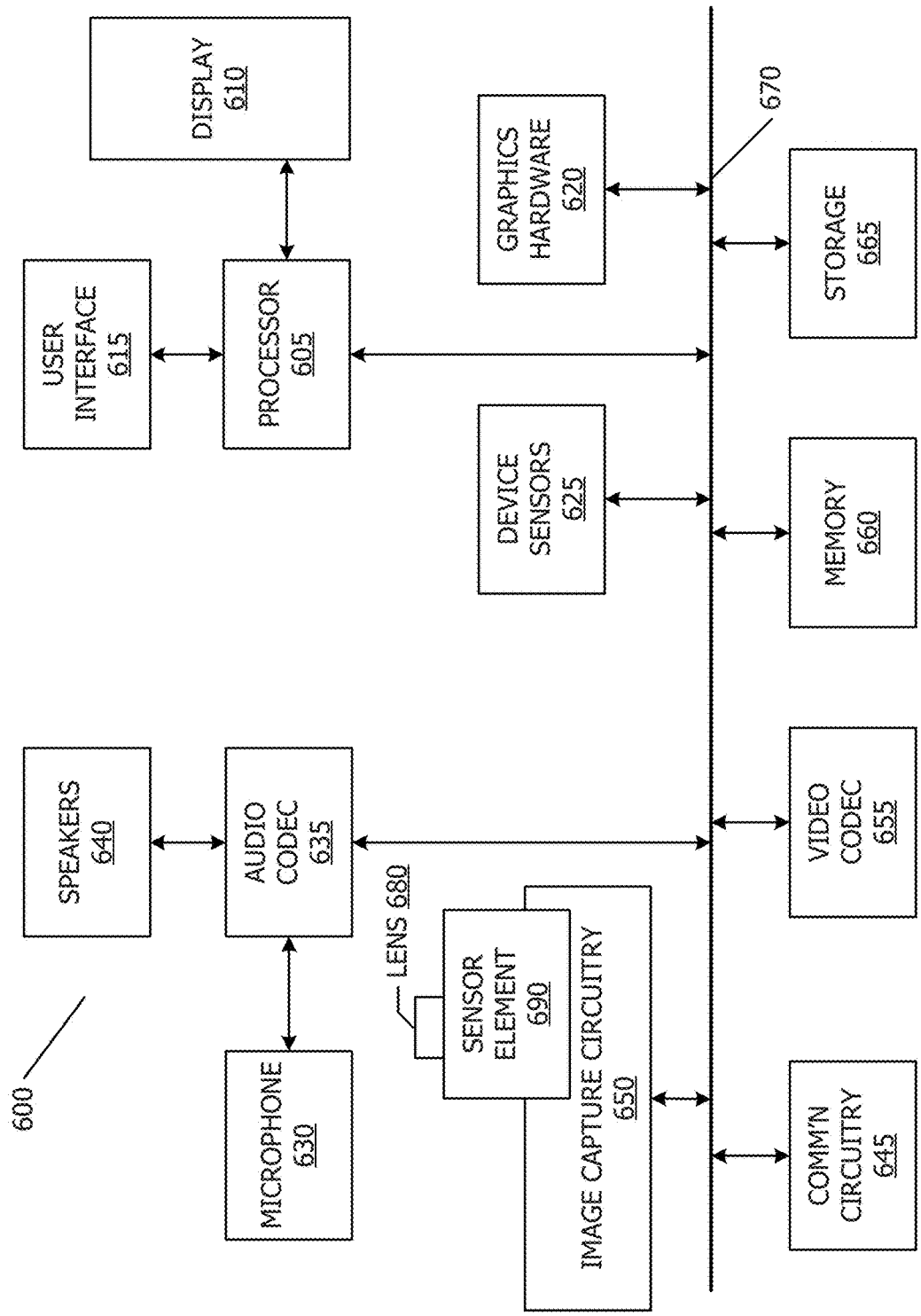
FIG. 6 shows, in block diagram form, a simplified multifunctional device according to one or more embodiments.

The following IOAccelDisplayPipeTransaction methods are currently unimplemented and unsupported.
getPipeScalerState
  Currently unused
  (sIOAccelDisplayPipeScaler) getPipeScalerState (void) const;
  Return Value
  The scaler associated with the display pipe.
  Parameters—None
getPlaneDstRect
  Returns the destination rectangle for the associated plane.
  (sIOAccelDisplayRect) getPlaneDstRect (uint32_t planeIndex) const
  Return Value
  The destination rectangle for the resource associated with the plane.
  Parameters—planeIndex The plane for this transaction
getPlaneGammaTable
  Returns the gamma data for the associated plane.
  (IOAccelDisplayPipeGammaTable*) getPlaneGammaTable (uint32_t planeIndex) const
  Return Value
  The gamma table object associated to the specified plane, if bound. Gamma table entries are provided as floats. Vendor implementations may need to convert table entry values to an appropriate hardware format.
  Parameters—planeIndex The plane for this transaction
getPlaneTransactionOptions
  Returns the options (see getTransactionOptions) associated with the display plane that have been set for the transaction.
  (uint32_t) getPlaneTransactionOptions (uint32_t planeIndex) const
  Return value
  The options associated with the plane that are set for the transaction.
  Parameters—planeIndex The plane for this transaction
  Related Definitions
  See getTransactionOptions for returned eIOAccelDisplayPipeTransactionOption option values.
getTimeStamp
  Currently unused
  (uint64_t) getTimeStamp (void) const;
  Return Value
  The time of the transaction.
  Parameters—None Referring now to FIG. 6, a simplified functional block diagram of illustrative multifunction device 600 is shown according to one embodiment. Multifunction electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture circuitry 650 video codec(s) 655 (e.g., in support of digital image capture unit 650), memory 660, storage device 665, and communications bus 670. Multifunction electronic device 600 may be, for example, a digital camera or a personal electronic device such as a personal digital assistant (PDA), personal music player, mobile telephone, or a tablet computer.

Processor 605 may execute instructions necessary to carry out or control the operation of many functions performed by device 600 (e.g., such as the transactional interface for a display pipeline as disclosed herein). Processor 605 may, for instance, drive display 610 and receive user input from user interface 615. User interface 615 may allow a user to interact with device 600. For example, user interface 615 can take a variety of forms, such as a button, keypad, dial, a click wheel, keyboard, display screen and/or a touch screen. Processor 605 may also, for example, be a system-on-chip such as those found in mobile devices and may include a dedicated GPU. Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable GPU.

Image capture circuitry 650 may include lens assembly 680. The lens assembly may have an associated sensor element 690. Alternatively, two or more lens assemblies may share a common sensor element. Image capture circuitry 650 may capture still and/or video images. Output from image capture circuitry 650 may be processed, at least in part, by video codec(s) 655 and/or processor 605 and/or graphics hardware 620, and/or a dedicated image processing unit or pipeline incorporated within image capture circuitry 650. Images so captured may be stored in memory 660 and/or storage 665.

Sensor and image capture circuitry 650 may capture still and video images that may be processed in accordance with this disclosure, at least in part, by video codec(s) 655 and/or processor 605 and/or graphics hardware 620, and/or a dedicated image processing unit incorporated within image capture circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605 such computer program code may implement one or more of the methods described herein.

Figure 7:
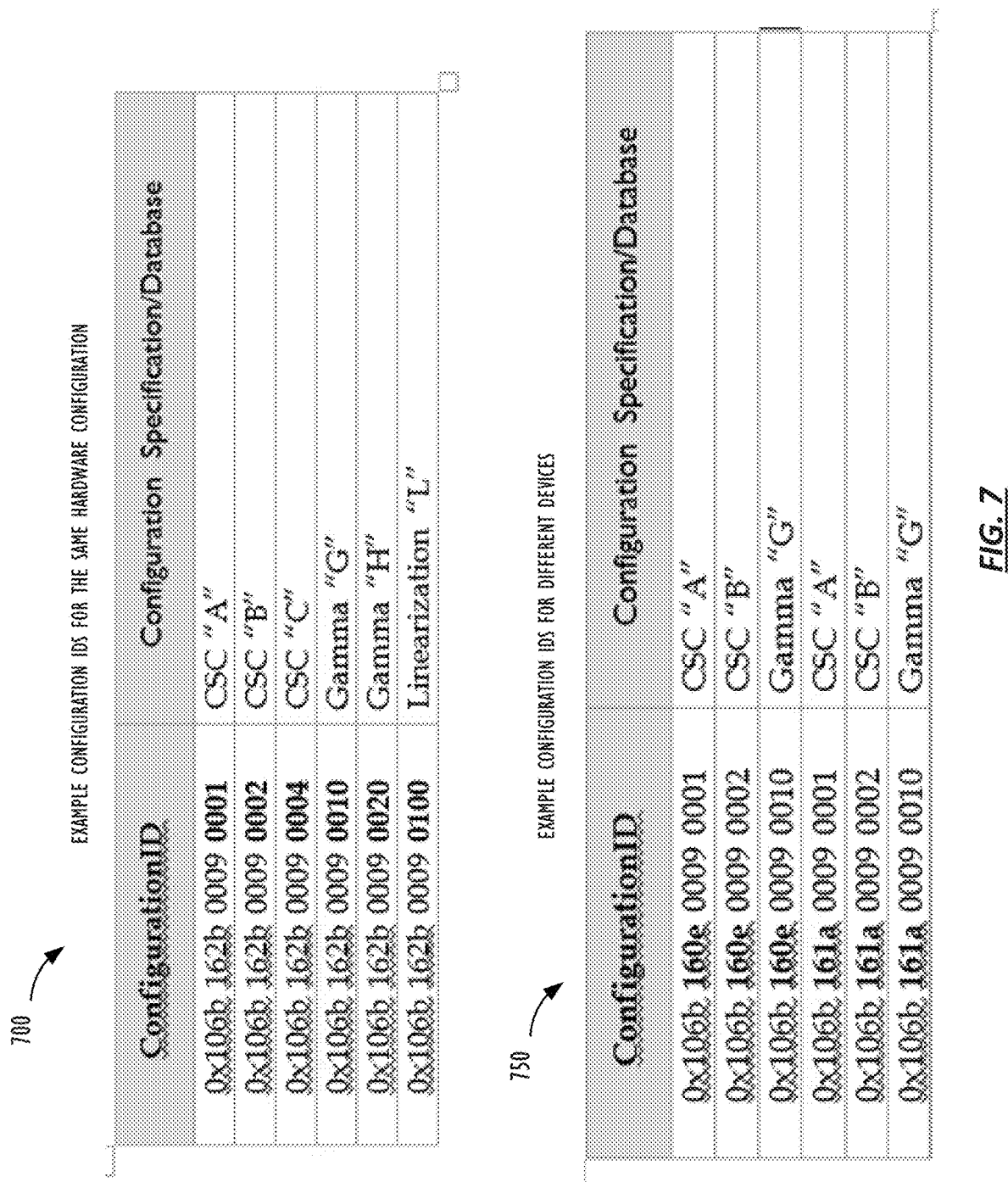
FIG. 7 shows, in table form, examples of configuration identifiers for the same hardware or different devices according to one or more embodiments.

ConfigurationID (See FIG. 7)

Third party vendors typically provide hardware specifications to software vendors that detail the hardware feature set for their devices. These specifications provide the software vendor with the details required to simulate hardware functionality through other means (for example, shaders). With the introduction of the IOAccelDisplayPipe transaction model, vendors and software providers can mutually decide to implement a vendor-supplied ConfigurationID that defines a given vendor's "configuration" and can capture differing implementations of display pipeline features from vendor-to-vendor and device-to-device. ConfigurationID describes complex features and functionality that cannot be accurately described with the existing capabilities fields or in a query function.

In one embodiment, the ConfiguratonID is a vendor-defined uint64_t token that describes the hardware and the specific feature. ConfigurationID is best described as an out-of-code way to document in-code functionality, and the vendor may implement ConfigurationID support as determined by the needs of the software vendor and the limitations of the vendor's hardware. Vendors must document the ConfigurationID in sufficient detail to allow a software vendor to leverage the configuration appropriately with expected results. The exact details of the feature, such as its limited, expected usage, are to be documented in a manner that the software vendor may access them. The specifications, the ConfigurationID, and the association of the ConfigurationID with a configuration describe to the software vendor how to best leverage the hardware and how to prepare the content being passed to the driver via IOPresentment (transaction path) for the specific configuration of Color Space Correction (CSC), Linearization, and/or Gamma.

ConfigurationID Definition and Format

As an example, a ConfigurationID may be a 64-bit value that consists of four 16-bit components: PCI Vendor ID, PCI Device ID, PCI Revision ID, and a vendor-supplied ID. Providing the PCI Vendor ID, PCI Device ID, PCI Revision ID, and vendor-supplied ID in this fashion allows a software vendor to quickly perform the appropriate lookups and meet the needs of both the software vendor and the vendor's choice of available functionality. Each vendor has its own hardware feature set. An individual feature is tied to its hardware and possibly specific revisions of their hardware. The first three components (48 bits) of ConfigurationID are tied to the vendor and the hardware device. The final component (16 bits), vendor-supplied ID, is unique to the software managing the hardware. The values of the first 48 bits are determined by the hardware, but the vendor has freedom on how to select the last 16 bits. ConfigurationIDs must be unique and represent a single configuration of CSC, Linearization, or Gamma. It is invalid to have a ConfigurationID of the same value that represents two different configurations. ConfigurationIDs that only differ by the vendor-supplied ID (that is, have the same PCI Vendor ID, PCI Device ID, and PCI Revision ID, but a different value in the last 16 bits) specify multiple software configurations that are supported by a single hardware implementation. In addition, the vendor may reserve bits in some logical fashion to identify specific configurations of functionality. For example, in Table 700, the vendor chooses to use the last 4 bits of the vendor-supplied ID to represent CSC configurations, the next-to-last 4 bits to represent Gamma configurations, and the next 4 bits to represent Linearization configurations, where multiple families or revisions of devices share the hardware functionality. Also, the vendor can impose the vendor-supplied ID bit organization across devices or revisions. For example, table 750 shows two different devices that have ConfigurationIDs that consistently represent the same software configuration.

The system and methods described above may be implemented in software, hardware, firmware, or any combination thereof. The processes are preferably implemented in one or more computer programs executing on a computer or other programmable device including a processor, a storage medium readable by the processor, and input and output devices. Each computer program can be a set of instructions (program code) in a code module resident in the random access memory of the computer. Until required by the computer, the set of instructions may be stored in another computer memory (e.g., in a hard disk drive, or in a removable memory such as an optical disk, external hard drive, memory card, or flash drive) or stored on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions.

The scope of the disclosed subject matter should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A system comprising:
 a processor;
 a graphics processing unit (GPU) communicatively coupled to the processor, the GPU having selectable GPU hardware features;
 a first software module comprising instructions that when executed by the processor configure the processor to receive graphics related transaction directives from a first user-level module via an application program interface, wherein the first user-level module enables a user to select one of the selectable GPU hardware features for the transaction;

the first software module including instructions that when executed by the processor bind transaction data with hardware feature data according to the graphics related transaction directives, wherein the transaction data comprises information that influences the transformation of pixels prior to presentation on a display device, and wherein the hardware feature data comprises information regarding the use of the selected GPU hardware feature;

a graphics pipeline of the GPU configured to:
receive from the first software module a transaction comprising the transaction data bound to the hardware feature data, and
transition to a new configuration of the graphics pipeline in accordance with the transaction at a single point in time; and a display for displaying a frame prepared using the new configuration of the graphics pipeline.

2. The system of claim 1 wherein the transaction data comprises one or more of pixel data, gamma tables, color space correction (CSC) matrices, pixel format, surface dimensions and transformation information.

3. The system of claim 1 wherein the hardware feature data comprises one or more of GPU gamma features, GPU color space correction (CSC) features, or GPU linearization features.

4. The system of claim 1, wherein the first software module includes instructions that when executed by the processor cause the processor to utilize a queue mechanism to manage the transaction data.

5. The system of claim 4, wherein the first software module including instructions that when executed by the processor cause the processor to concurrently interface with a second user-level software module and the first user-level software module and submit individual transactions for the first and second user-level software modules to the queue mechanism.

6. The system of claim 1, wherein the first software module includes instructions that when executed by the processor cause the processor to perform a query function to obtain capability features of the GPU from which the hardware feature data is obtained.

7. The system of claim 6, wherein the query function initiate a call to an API that returns information describing the GPU for capability information retrieved directly from the GPU.

8. The system of claim 7, wherein the first software module includes instructions to cause the processor to initiate the query function a plurality of times to determine capability information for different features.

9. The system of claim 6, wherein the query function determines a configuration identifier uniquely indicating a definition set of capabilities for the GPU.

10. The system of claim 1, wherein the graphics pipeline is configured to process a queue of transactions through a plurality of pipeline flow stages including wait, pending, live, and finished.

11. The system of claim 1, wherein a plurality of instances of the first software module are configured to execute concurrently on the system.

12. The system of claim 11, wherein there is a one to one correspondence between a number of instances of the first software module and a number of instances of displays configured to work in a transactional manner communicatively coupled to the system.

13. The system of claim 1, wherein the first software module is configured to utilize a queue mechanism to manage the transaction data and the first software module is further configured to utilize a locking scheme to coordinate the queue management with a vendor implementation associated with the GPU.

14. The system of claim 1, wherein the transaction directives are received after a transaction validation phase between a user client and a vendor driver, and after preparation of transaction resources.

15. A method comprising:
in a system including a graphics processing unit (GPU), discovering feature data regarding the GPU;
binding the feature data with transaction data according to transaction directives received through an application program interface from a user level software module, wherein the user level software module enables a user to select a GPU hardware feature for the transaction;
wherein the transaction data comprises information that influences the transformation of pixels prior to presentation on a display device, and
wherein the feature data comprises information regarding use of the selected GPU hardware feature;
submitting a transaction to a graphics pipeline of the GPU, the transaction including the transaction data bound to the feature data; and
transitioning to a new configuration of the graphics pipeline in accordance with the transaction at a single point in time; and
preparing a frame for display on the display device based on the new configuration of the graphics pipeline.

16. The method of claim 15, wherein discovering the feature data comprises receiving one or more configuration identifiers (IDs).

17. The method of claim 16, wherein discovering the feature data further comprises applying the one or more configuration IDs to a look up table and extracting the feature data thereby.

18. The method of claim 17, wherein the look up table comprises information describing one or more features of the GPU and one or more corresponding configuration IDs of the one or more configuration IDs.

19. The method of claim 17, wherein the lookup table comprises information regarding features of a plurality of GPUs.

20. The method of claim of claim 15, wherein submitting the transaction comprises submitting the transaction to a queueing mechanism configured to manage a plurality of transactions.

21. The method of claim 15, wherein the transaction directives are received after a transaction validation phase between a user client and a vendor driver, and after preparation of transaction resources.

22. A non-transitory computer-readable medium storing computer-readable code executable by one or more processors to cause the one or more processors to:
discover feature data regarding a graphics processing unit (GPU);
bind the feature data with transaction data according to transaction directives received through an application program interface from a user level software module, wherein the first user-level module enables a user to select a GPU hardware feature for the transaction, wherein the transaction data comprises information that influences the transformation of pixels prior to presentation on a display device, and wherein the feature data comprises information regarding the use of the selected GPU hardware feature;

submit a transaction to a graphics pipeline of the GPU, the transaction including the transaction data bound to the feature data;

transition to a new configuration of the graphics pipeline in accordance with the transaction at a single point in time; and prepare a frame for display on the display device based on the new configuration of the graphics pipeline.

23. The non-transitory computer-readable medium of claim 22, wherein the computer-readable code includes code, when executed by the one or more processors, causes the one or more processors to obtain the feature data, at least in part, using one or more configuration identifiers (IDs).

24. The non-transitory computer-readable medium of claim 22, wherein the computer-readable code, when executed by the one or more processors, causes the one or more processors to discover the feature data, at least in part, by applying the one or more configuration IDs to a look up table and extract feature data thereby.

25. The non-transitory computer-readable medium of claim 24, wherein the look up table comprises information describing one or more features of the GPU and one or more corresponding configuration IDs of the one or more configuration IDs.

26. The non-transitory computer-readable medium of claim 24, wherein the lookup table comprises information regarding features of a plurality of GPUs.

27. The non-transitory computer-readable medium of claim 22, wherein the computer-readable code, when executed by the one or more processors, causes the one or more processors to submit the transaction to a queueing mechanism configured to manage a plurality of transactions.

28. The non-transitory computer-readable medium of claim 22, wherein the computer-readable code, when executed by the one or more processors, causes the one or more processors to receive the transaction directives after a transaction validation phase between a user client and a vendor driver, and after preparation of transaction resources.

* * * * *